(12) United States Patent
Chen et al.

(10) Patent No.: US 11,773,322 B2
(45) Date of Patent: Oct. 3, 2023

(54) PREPARATION AND APPLICATION OF DYE-FUNCTIONALIZED FLEXIBLE UPCONVERSION-LUMINESCENCE SOLID-PHASE SENSOR

(71) Applicant: JIANGSU UNIVERSITY, Zhenjiang (CN)

(72) Inventors: Quansheng Chen, Zhenjiang (CN); Jizhong Wu, Zhenjiang (CN); Huanhuan Li, Zhenjiang (CN); Jingui Zhang, Zhenjiang (CN); Hao Lin, Zhenjiang (CN); Haihui Pan, Zhenjiang (CN); Fuyun Wang, Zhenjiang (CN); Yue Liang, Zhenjiang (CN); Aijuan Ma, Zhenjiang (CN); Tianyu Cao, Zhenjiang (CN); Xiafei Xu, Zhenjiang (CN); Huanke Hou, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/309,595

(22) Filed: Apr. 28, 2023

(65) Prior Publication Data
US 2023/0265341 A1 Aug. 24, 2023

Related U.S. Application Data

(63) Continuation of application No. PCT/CN2023/077481, filed on Feb. 21, 2023.

(30) Foreign Application Priority Data

Feb. 28, 2022 (CN) .......................... 202210191490.2

(51) Int. Cl.
*C09K 11/77* (2006.01)
*G01N 21/78* (2006.01)

(52) U.S. Cl.
CPC .................. *C09K 11/7772* (2013.01)

(58) Field of Classification Search
CPC .............. G01N 21/783; C09K 11/7772; C09K 11/7773
See application file for complete search history.

(56) References Cited

U.S. PATENT DOCUMENTS

| 5,711,915 A | 1/1998 | Siegmund et al. |
| 9,316,591 B1 | 4/2016 | Neethirajan |
| (Continued) | | |

FOREIGN PATENT DOCUMENTS

| CN | 109060747 A | 12/2018 |
| CN | 109211857 A | 1/2019 |
| (Continued) | | |

OTHER PUBLICATIONS

Cuilan Zhang et al., "Surface lanthanide activator doping for constructing highly efficient energy transfer-based nanoprobes for the on-site monitoring of atmospheric sulfur dioxide", Analyst, 2019, Entire document.

(Continued)

*Primary Examiner* — Matthew E. Hoban

(57) ABSTRACT

A method of preparing a dye-functionalized flexible upconversion-luminescence solid-phase sensor, including: preparation of upconversion-luminescence nanoparticles, preparation of an upconversion nanoparticle-doped solid-phase sensor, and preparation of a dye-functionalized flexible upconversion-luminescence solid-phase sensor. A method for detecting a gaseous pollutant is also provided, including: preparing a dye-functionalized flexible upconversion-luminescence solid-phase sensor through the above method; establishing a prediction model; and substituting a fluorescence intensity of a sample into the prediction model to calculate the gaseous pollutant concentration in the sample.

10 Claims, 5 Drawing Sheets

(56) References Cited

U.S. PATENT DOCUMENTS

| | | | |
|---|---|---|---|
| 10,913,892 B1 | 2/2021 | Gui et al. | |
| 2013/0115172 A1* | 5/2013 | Jang | C09K 11/7772 427/127 |
| 2019/0040315 A1* | 2/2019 | Nithyanandhan | C09K 11/025 |
| 2020/0300760 A1 | 9/2020 | Luo et al. | |
| 2021/0025879 A1 | 1/2021 | Guan | |
| 2021/0055229 A1 | 2/2021 | Löbbert | |
| 2021/0156867 A1 | 5/2021 | Margulies et al. | |

FOREIGN PATENT DOCUMENTS

| | | |
|---|---|---|
| CN | 110361367 A | 10/2019 |
| CN | 112540064 A | 3/2021 |
| CN | 112730360 A | 4/2021 |
| CN | 113310956 A | 8/2021 |
| CN | 113588618 A | 11/2021 |
| CN | 113670887 A | 11/2021 |
| CN | 114674791 A | 6/2022 |
| EP | 3771487 A1 | 2/2021 |
| KR | 20190080581 A | 7/2019 |
| WO | 2016186412 A1 | 11/2016 |

OTHER PUBLICATIONS

Shuailiang Wang et al., "A ratiometric upconversion nanoprobe for fluorometric turn-on detection of sulfite and bisulfite", Microchimica Acta (2018) 185: 218, Entire document.

Yiwen Zhai et al., "A high performance fluorescence switching system triggered electrochemically by Prussian blue with upconversion nanoparticles", Nanoscale, 2016, Entire document.

* cited by examiner

PREPARATION AND APPLICATION OF DYE-FUNCTIONALIZED FLEXIBLE UPCONVERSION-LUMINESCENCE SOLID-PHASE SENSOR

CROSS-REFERENCE TO RELATED APPLICATIONS

This application is a continuation of International Patent Application No. PCT/CN2023/077481, filed on Feb. 21, 2023, which claims the benefit of priority from Chinese Patent Application No. 202210191490.2, filed on Feb. 28, 2022. The content of the aforementioned application, including any intervening amendments thereto, is incorporated herein by reference in its entirety.

TECHNICAL FIELD

This application relates to food and environment detection, and more particularly to a preparation and application of a dye-functionalized flexible upconversion-luminescence solid-phase sensor.

BACKGROUND

Gaseous pollutants and their derivatives (namely, gaseous pollutant derivatives) are closely related to human life in environment, physiology, and food processing. Gaseous pollutant derivatives refer to gases that are discharged into the air or water and are potentially harmful to humans, such as derivatives produced by reaction of carbon monoxide, sulphur dioxide, or carbon dioxide in water and air. These harmful gases mainly come from volcanic eruptions and exhaust emissions. Although these gases are potentially hazardous to humans, they can be beneficial when controlled and applied in other reasonable ways. For example, endogenous sulphur dioxide is involved in the functions of the cardiovascular system, lungs, and kidneys. Sulfites have been widely used as preservatives and antioxidant additives for inhibiting the microbial growth and excessive oxidation in food.

Concentrations of gaseous pollutants have been specified in the Chinese national standard GB 3095-2012 "Ambient air quality standards". Conventionally, the concentration of sulphur dioxide and its derivatives can be determined by the particle chromatography method and the ultraviolet fluorescence method, and the concentration of carbon dioxide and its derivatives can be detected through the direct spectral absorption method and the modulated spectral absorption method. Unfortunately, these methods are complicated, highly difficult, and costly. Moreover, they are merely suitable for one or a few gas pollutants, and cannot achieve the rapid, economic, and specific detection of a variety of gaseous pollutants.

SUMMARY

To overcome the technical problems in the prior art, the present disclosure provides a method of preparing a dye-functionalized flexible upconversion-luminescence solid-phase sensor, which is beneficial to the rapid and specific detection of gaseous pollutant derivatives in the food and environment.

Technical solutions of this application are described below.

In a first aspect, the disclosure provides a method of preparing a dye-functionalized flexible upconversion-luminescence solid-phase sensor, comprising:

(S1) mixing ytterbium chloride hexahydrate, yttrium chloride hexahydrate, and thulium chloride hexahydrate uniformly in a first solvent under ultrasonication; adding oleic acid and 1-octadecene followed by a first stirring and cooling to room temperature; dropwise adding sodium hydroxide, ammonium fluoride and a second solvent followed by sealing, heating, a second stirring, cooling to room temperature, and centrifugation to collect a precipitate; and rinsing the precipitate with a mixture of cyclohexane and ethanol followed by drying to give an upconversion-luminescence nanoparticle; wherein the first solvent and the second solvent are both methanol;

(S2) mixing a polydimethylsiloxane monomer and a curing agent to obtain a mixture; adding the upconversion-luminescence nanoparticle to the mixture followed by stirring to form a gel; subjecting the gel to vacuum degassing, casting in a mold and vacuum degassing; pressing the mold with a cover plate followed by drying, curing, and cooling to room temperature to obtain an upconversion-luminescence nanoparticle-doped solid-phase sensor; and (S3) mixing sodium periodate, benzyl alcohol, acrylic acid and water to form a first solution; immersing the upconversion-luminescence nanoparticle-doped solid-phase sensor into the first solution followed by ultraviolet (UV) irradiation and a first rinsing to obtain a carboxyl-grafted upconversion-luminescence nanoparticle-doped solid-phase sensor; and mixing 1-(3-dimethylaminopropyl)-3-ethylcarbodiimide hydrochloride, hydroxysuccinimide, distilled water and a 2-(N-morpholino) ethanesulfonic acid buffer in a ratio of 10-30 (mg):5-15 (mg):0.5-1.5 (mL):0.3-0.6 (mL) to form a second solution; immersing the carboxyl-grafted upconversion-luminescence nanoparticle-doped solid-phase sensor into the second solution for incubation for 2 h followed by a second rinsing with distilled water to obtain a carboxyl-activated upconversion-luminescence nanoparticle-doped solid-phase sensor; immersing the carboxyl-activated upconversion-luminescence nanoparticle-doped solid-phase sensor into a pararosaniline solution for incubation for 11-13 h followed by a third rinsing with distilled water to obtain the dye-functionalized flexible upconversion-luminescence solid-phase sensor.

In some embodiments, in step (S1), a ratio of the first solvent to the ytterbium chloride hexahydrate to the yttrium chloride hexahydrate to the thulium chloride hexahydrate is 5-15 (mL):0.03-0.1 (g):0.2-1 (g):0.001-0.01 (g); a volume ratio of the first solvent to the oleic acid to the 1-octadecene is 5-15:3-10:10-20; a ratio of the first solvent to the sodium hydroxide to the ammonium fluoride to the second solvent is 5-15 (mL):0.1-0.3 (g):0.1-0.3 (g):5-15 (mL); and a volume ratio of the cyclohexane to the ethanol is 1:1.

In some embodiments, in step (S1), the first stirring is performed magnetically at 150-170° C. under protection of nitrogen gas for 25-35 min; the heating is performed at 50-80° C. for 30-50 min; and the second stirring is performed at 290-310° C. for 50-70 min.

In some embodiments, in step (S2), a weight ratio of the polydimethylsiloxane monomer to the curing agent is 5-15:1-3; a weight ratio of the upconversion luminescence nanoparticles to the mixture is 1:500; and the drying is performed at 90-110° C. for 50-70 min.

In some embodiments, in step (S3), a weight ratio of the sodium periodate to the benzyl alcohol to the acrylic acid to the water is 0.01-0.02:0.5-0.8:8-12:85-95; the UV irradiation is performed for 2-3 h; and the first rinsing is performed at 65-75° C. A ratio of the dimethylaminopropyl-3-ethylcarbodiimide hydrochloride to the hydroxysuccinimide to the distilled water to the morpholine ethanesulfonic acid buffer is 10-30 mg: 5-15 (mg):0.5-1.5 (mL):0.3-0.6 (mL); a concentration of the pararosaniline solution is 0.01-0.05 mg/mL; an incubation time in the pararosaniline solution is 11-13 h; and the third rinsing is performed at room temperature.

In a second aspect, this application provides a method for detecting a gaseous pollutant by using the aforementioned dye-functionalized flexible upconversion luminescence solid-phase sensor, comprising:

(a) preparing a dye-functionalized flexible upconversion-luminescence solid-phase sensor through the aforementioned method.

(b) immersing the dye-functionalized flexible upconversion-luminescence solid-phase sensor respectively into standard solutions of the gaseous pollutant varying in concentration for reaction; drying the dye-functionalized flexible upconversion-luminescence solid-phase sensor with nitrogen gas; detecting fluorescence intensity signal characteristic values of the dye-functionalized flexible upconversion-luminescence solid-phase sensor respectively corresponding to the standard solutions; and performing linear fitting between concentrations of the standard solutions of the gaseous pollutant and the fluorescence intensity signal characteristic values, so as to establish a prediction model for concentration detection of the gaseous pollutant; and (c) subjecting a sample to preprocessing and extraction to obtain a solution containing the gaseous pollutant, wherein the sample is a food sample or an environment sample; immersing the dye-functionalized flexible upconversion-luminescence solid-phase sensor into the solution for reaction; drying the dye-functionalized flexible upconversion-luminescence solid-phase sensor with nitrogen gas; detecting a fluorescence intensity signal characteristic value corresponding to the sample; and substituting the fluorescence intensity signal characteristic value into the prediction model to calculate a concentration of the gaseous pollutant in the sample.

In some embodiments, in step (b), the concentrations of the standard solutions of the gaseous pollutant derivative are 0-100 nM.

In some embodiments, in step (c), the gaseous pollutant derivative is selected from the group consisting of sulphur dioxide and derivatives thereof, carbon monoxide and derivatives thereof, ozone and derivatives thereof, and a combination thereof.

In some embodiments, in step (b), the reaction is performed for 9-11 min; and step (c), the reaction is performed for 9-11 min.

Compared with the prior art, this application at least has the following beneficial effects.

(1) This application discloses a method of preparing a dye-functionalized flexible upconversion-luminescence solid-phase sensor, which includes synthesis of upconversion nanoparticles by thermal decomposition, uniform mixing of the upconversion nanoparticles with a solid-phase sensor, addition of a curing agent, and casting. The method provided herein has simple operation and reaction conditions.

(2) This application also discloses a method for detecting a gaseous pollutant derivative by using the aforementioned dye-functionalized flexible upconversion-luminescence solid-phase sensor. Specifically, the pararosaniline dye in the dye-functionalized flexible upconversion-luminescence solid-phase sensor, which is prepared by the carbon-based ammonia reaction, acts as the fluorescence acceptor, and the upconversion nanoparticles act as the fluorescence donor to exert the fluorescence inner-filter effect, so as to achieve accurate and rapid detection of the concentration of the gaseous pollutant derivative.

(3) The dye-functionalized flexible upconversion-luminescent solid-phase sensor provided herein is recyclable and renewable, which can be effectively recycled six times. Moreover, it is portable and economic, exhibiting a good practical application prospect.

DETAILED DESCRIPTION OF EMBODIMENTS

The disclosure will be described in detail below with reference to embodiments to show the application in the practical sample detection. It should be noted that the detailed description is merely illustrative, and should not be considered as limitations to the present disclosure.

The sulphur dioxide derivatives tested in this embodiment refer to the derivatives obtained from sulphur oxide through the chemical reaction in air or in aqueous solution.

The sample analyzed herein is a dry red wine purchased from Zhenjiang RT-mart with an alcohol content of 13.5% vol (originating in Chateau Lafite Rothschild (France)).

Example 1

Provided herein was a method of preparing a dye-functionalized flexible upconversion-luminescence solid-phase sensor, which included the following steps.

(S1) Preparation of Upconversion Nanoparticles 10 mL of methanol, 0.2412 g of yttrium chloride hexahydrate, 0.0775 g of ytterbium chloride hexahydrate, and 0.0019 g of thulium chloride hexahydrate were added into a flask, and ultrasonically mixed. Then 6 mL of oleic acid and 15 mL of 1-octadecene were added into the flask, and the reaction mixture was reacted at 160° C. under magnetic stirring and the protection of nitrogen gas for 30 min. After cooled to room temperature, the reaction mixture was dropwise added with a mixture solution containing 0.1 g of sodium hydroxide, 0.1482 g ammonium fluoride and 10 mL methanol. After that, the flask was sealed, heated at 80° C.

for 40 min to evaporate the methanol, magnetically stirred at 300° C. for 1 h, cooled to room temperature, and then centrifuged to obtain upconversion nanoparticle precipitates. The upconversion nanoparticle precipitates were rinsed with a mixture of cyclohexane and ethanol in a volume ratio of 1:1 three times, and dried to obtain the upconversion-luminescence nanoparticles.

Figure 1:
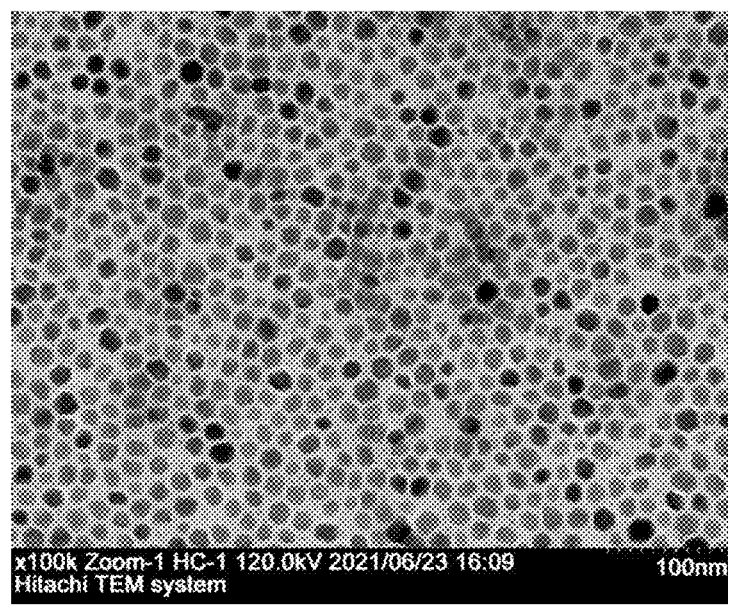
FIG. 1 is a transmission electron microscope (TEM) image of upconversion nanoparticles prepared in Example 1.

FIG. 1 was a transmission electron microscope (TEM) image of the prepared upconversion nanoparticles, indicating that the upconversion-luminescence nanoparticles were successfully prepared.

(S2) Preparation of an Upconversion-Luminescence Nanoparticle-Doped Solid-Phase Sensor A polydimethylsiloxane monomer and a curing agent were mixed in a weight ratio of 10:1 to obtain a mixture. 20 mg of the upconversion-luminescence nanoparticles prepared in step (S1) was added into the mixture followed by stirring to form a gel, where a weight ratio of the upconversion-luminescence nanoparticles to the mixture was 1:500. After vacuum degassing, the gel was subjected to casting in a mold followed by vacuum degassing. After that, the mold was pressed with a poly methyl methacrylate cover plate for curing in a dry environment, followed by cooling to room temperature and the removal of the polymethyl methacrylate cover plate, so as to obtain the upconversion-luminescence nanoparticle-doped solid-phase sensor.

Figure 2:
FIG. 2 is a Mapping image of an upconversion nanoparticle-doped solid-phase sensor prepared in Example 1.

FIG. 2 showed a mapping image of the prepared upconversion-luminescence nanoparticle-doped solid-phase sensor, that is, a mapping image of an upconversion-luminescent flexible sensor without dyeing.

(S3) Preparation of a Dye-Functionalized Flexible Upconversion-Luminescence Solid-Phase Sensor 0.0107 g of sodium periodate, 0.5 g of benzyl alcohol, 10 g of acrylic acid were added into 89.5 g of water for mixing to form a first aqueous solution. Polydimethylsiloxane was immersed into the first aqueous solution, followed by ultraviolet (UV) irradiation for 2.5 h and rinsing with 70° C. distilled water to remove the surface adsorbed acrylic acid and other polymers, so as to obtain a carboxyl-grafted upconversion-luminescence nanoparticle-doped solid-phase sensor.

20 mg of 1-(3-dimethylaminopropyl)-3-ethylcarbodiimide hydrochloride, 10 mg of hydroxysuccinimide, 0.5 mL of distilled water and 0.45 mL of 2-(N-morpholino) ethanesulfonic acid buffer were mixed to form a second aqueous solution. The carboxyl-grafted upconversion-luminescence nanoparticle-doped solid-phase sensor was incubated in the second aqueous solution for 2 h, followed by rinsing with distilled water to obtain a carboxyl-activated upconversion-luminescence nanoparticle-doped solid-phase sensor. The carboxyl-activated solid-phase sensor was completely immersed into a solution of 0.01 mg/mL pararosaniline for 12 h at room temperature, and then rinsed with distilled water to obtain the dye-functionalized flexible upconversion-luminescence solid-phase sensor.

Figure 3:
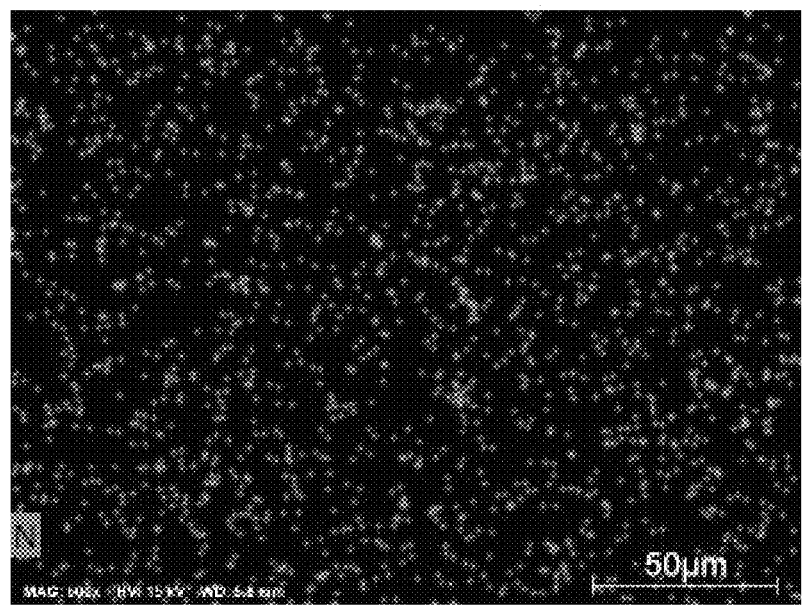
FIG. 3 is a Mapping image of a dye-functionalized flexible upconversion-luminescence solid-phase sensor prepared in Example 1.

FIG. 3 was a mapping image of the dye-functionalized flexible upconversion-luminescence solid-phase sensor. Compared with FIG. 2, it illustrated that the upconversion-luminescence solid-phase sensor was successfully dye-functionalized.

The concentrations of sulphur dioxide derivatives in wine were detected through the following steps.

(i) Establishment of a Prediction Model for Concentration Detection of Sulphur Dioxide Derivatives The dye-functionalized flexible upconversion-luminescence solid-phase sensor was respectively added to standard solutions of a gas pollutant varying in concentration for reaction. After the reaction, the dye-functionalized flexible upconversion-luminescence solid-phase sensor was dried with nitrogen gas, and the fluorescence intensity signal characteristic values of the dye-functionalized flexible upconversion-luminescence solid-phase sensor respectively corresponding to the standard solutions were determined. A linear fitting was performed between the concentration of the standard solutions of the gaseous pollutant and the fluorescence intensity signal characteristic values, so as to establish a prediction model for concentration detection of the gaseous pollutant, as shown in FIG. 4B.

Specifically, sulphur dioxide standard solutions with concentrations of 0 nM, 10 nM, 20 nM, 30 nM, 40 nM, 50 nM, 60 nM, 70 nM, 80 nM, 90 nM and 100 nM were prepared. 100 μL of each sulphur dioxide standard solution was added to a specific detection system for incubation at 37° C. for 25 min. After that, the fluorescence signal characteristic values were collected.

The fluorescence intensity signal characteristic value of the detection solution was determined through the following steps. The fluorescence intensity signal characteristic value of the solid-phase sensor was determined at 541 nm under 980 nm excitation light excitation. The fluorescence intensity value $F_0$ of the solid-phase sensor without sulphur dioxide derivatives and the fluorescence intensity value F of the solid-phase after adding sulphur dioxide standard solution were record. the fluorescence intensity characteristic signal value of the detection solution was calculated by $(F-F_0)/F_0$.

Figure 4A:
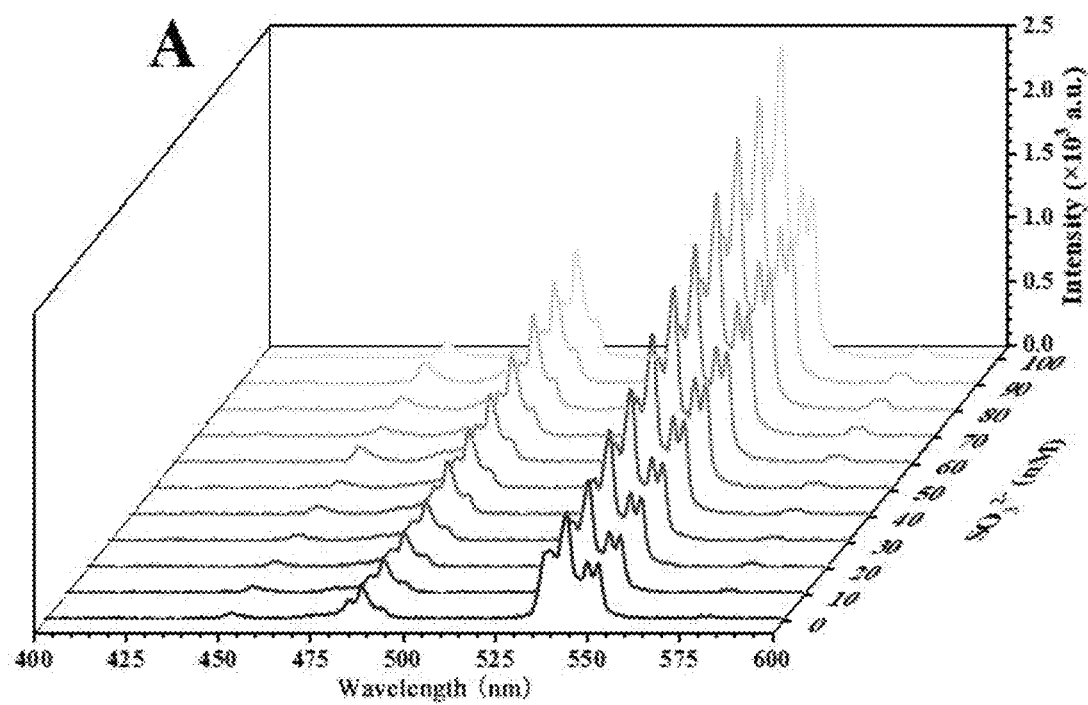
FIGS. 4A-4B show a prediction model established in Example 1 based on a series of sulphur dioxide derivative standard solutions varying in concentration, where 4A: fluorescence intensity signals of the dye-functionalized flexible upconversion-luminescence solid-phase sensor corresponding to the standard solutions; and 4B: standard curve plotted based on concentrations of the standard solutions and the fluorescence intensity signals.
Figure 4B:
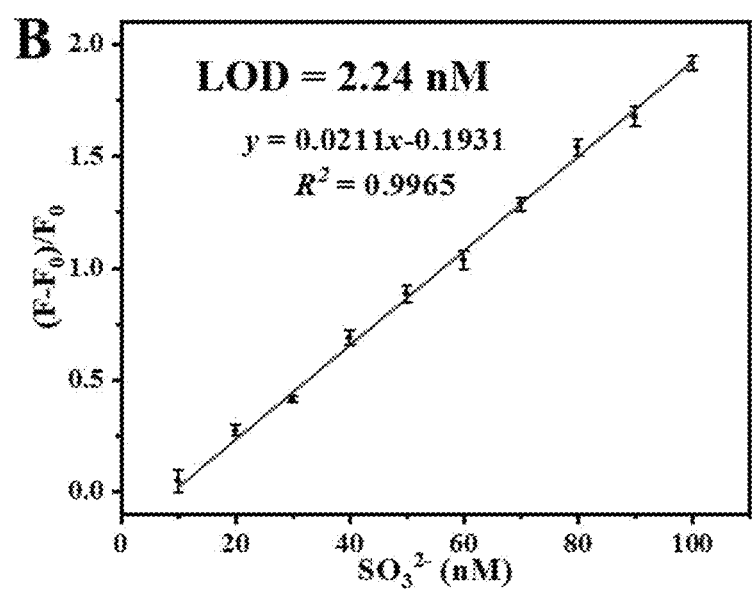

FIGS. 4A-4B showed a standard curve established for the sulphur dioxide derivatives with different concentrations.

As shown in FIG. 4A, the fluorescence signal at 541 nm was enhanced with the increase of sulphur dioxide concentration in the sulphur dioxide standard solution. As shown in FIG. 4B, the standard curve $(F-F_0)/F_0=0.0211 \log(C_{ER})-0.1931$ for sulphur dioxide detection was plotted by linear fitting, where the correlation coefficient $R^2=0.9965$, the detection limit (LOD) was 2.24 nM, and the linear range was 10-100 mg/L.

(ii) Detection of Concentrations of Sulphur Dioxide Derivatives in Wine

Four 10 mL wine samples were prepared, labeled as A, B, C and D, respectively. 1 mL of sodium bicarbonate solution (5 mM) was added to each of the four wine samples to ensure that the sulphur dioxide derivatives in the wine were present in the form of sulphite. Subsequently, the four wine samples were each diluted 5000 times, and 100 μL of each diluted wine sample was taken for detection. After incubation with the dye-functionalized flexible upconversion luminescence solid-phase sensor for 25 min, the fluorescence intensity signal characteristic value was measured and substituted into the standard curve obtained in step (S1) to calculate the concentrations of sulphur dioxide derivatives contained in the four wine samples A, B, C and D to be 19.877 mg/L, 9.11 mg/L, 10.365 mg/L and 8.313 mg/L, respectively. Comparing the concentrations of sulphur dioxide derivatives in the four samples determined by the national standard method-titration, i.e., 19.877 mg/L, 9.11 mg/L, 10.365 mg/L, and 8.313 mg/L, it showed that the detection method provided in the present disclosure had a high accuracy.

The flexible upconversion luminescent solid-phase sensor was regenerated through the following steps. After reacting with the sulphur dioxide derivative sample solution, the surface carboxyl groups of the solid-phase sensor were activated again according to the operation described in step (S3). After that, the solid-phase sensor was rinsed with distilled water to obtain the surface carboxyl-activated solid-phase sensor, so as to achieve the regeneration of the flexible upconversion luminescent solid-phase sensor. The same sensor was used for the same sulphur dioxide derivative for repeated detection and regeneration. The detection accuracy was more than 90% after regenerated within 3 times, and more than 80% after regenerated within 6 times.

Example 2

Provided herein was a method of preparing a dye-functionalized flexible upconversion-luminescence solid-phase sensor, which included the following steps.

(S1) Preparation of Upconversion Nanoparticles mL of methanol, 0.2412 g of yttrium chloride hexahydrate, 0.0775 g of ytterbium chloride hexahydrate, and 0.0019 g of thulium chloride hexahydrate were added into a flask, and ultrasonically mixed. Then 6 mL of oleic acid and 15 mL of Li-octadecene were added into the flask, and the reaction mixture was reacted at 160° C. under magnetic stirring and the protection of nitrogen gas for 30 min. After cooled to room temperature, the reaction mixture was dropwise added with a mixture solution containing 0.1 g of sodium hydroxide, 0.1482 g ammonium fluoride and 10 mL methanol. After that, the flask was sealed and heated at 80° C. for 40 min to evaporate the methanol, magnetically stirred at 300° C. for 1 h, cooled to room temperature, and centrifuged to obtain an upconversion nanoparticle precipitate. The upconversion nanoparticle precipitate was rinsed with a mixture of cyclohexane and ethanol in a volume ratio of 1:1 three times, and dried to obtain the upconversion-luminescence nanoparticles.

(S2) Preparation of an Upconversion-Luminescence Nanoparticle-Doped Solid-Phase Sensor A polydimethylsiloxane monomer and a curing agent were mixed in a mass ratio of 10:1 to obtain a mixture. 20 mg of the upconverted-luminescence nanoparticles prepared in step (S1) was added into the mixture followed by stirring to form a gel, where the weight ratio of the upconverted-luminescence nanoparticles to the mixture was 1:500. After vacuum degassing, the gel was subjected to casting in a mold followed by vacuum degassing. After that, the mold was pressed with a poly methyl methacrylate cover plate for curing in a dry environment, followed by cooling to room temperature and the removal of the polymethyl methacrylate cover plate to obtain the upconversion-luminescence nanoparticle-doped solid-phase sensor.

(S3) Preparation of a Dye-Functionalized Flexible Upconversion-Luminescence Luminescence Solid-Phase Sensor 0.0107 g of sodium periodate, 0.5 g of benzyl alcohol, 10 g of acrylic acid were added into 89.5 g of water for mixing to form a first aqueous solution. Polydimethylsiloxane was immersed into the first aqueous solution, followed by UV irradiation for 2.5 h and rinsing with 70° C. distilled water to remove the surface adsorbed acrylic acid and other polymers, so as to obtain a carboxyl-grafted upconversion nanoparticle-doped solid-phase sensor. 20 mg of 1-(3-dimethylaminopropyl)-3-ethylcarbodiimide hydrochloride, 10 mg of hydroxysuccinimide, 0.5 mL of distilled water and 0.45 mL of 2-(N-morpholino) ethanesulfonic acid buffer were mixed to form a second aqueous solution. The carboxyl group-grafted upconversion nanoparticle-doped solid-phase sensor was incubated in the second aqueous solution for 2 h, followed by rinsing with distilled water to obtain the carboxyl-activated solid-phase sensor. The carboxyl-activated solid-phase sensor was completely immersed in a solution of 0.01 mg/mL pararosaniline for 12 h at room temperature, and then rinsed with distilled water to obtain the dye-functionalized flexible upconversion-luminescence solid-phase sensor.

The concentrations of sulphur dioxide derivative in rainwater were detected through the following steps.

(i) Establishment of a Prediction Model for Concentration Detection of Sulphur Dioxide Derivative.

The dye-functionalized flexible upconversion luminescence solid-phase sensors were respectively added to standard solutions of a gaseous pollutant varying in concentrations for reaction. After the reaction, the dye-functionalized flexible upconversion-luminescence solid-phase sensor was dried with nitrogen gas, and the fluorescence intensity signal characteristic values of the dye-functionalized flexible upconversion-luminescence solid-phase sensor respectively corresponding to the standard solutions were determined. A linear fitting was performed between the concentration of the standard solutions of the gaseous pollutant and the fluorescence intensity signal characteristic values, so as to establish a prediction model for detecting concentrations of gas contamination derivatives.

Specifically, sulphur dioxide standard solutions with concentrations of 0 nM, 10 nM, 20 nM, 30 nM, 40 nM, 50 nM, 60 nM, 70 nM, 80 nM, 90 nM and 100 nM were prepared. 100 µL of each sulphur dioxide standard solution was added to a specific detection system for incubation at 37° C. for 25 min. After that, the fluorescence signal characteristic values were collected.

The fluorescence intensity signal characteristic value of the detection solution was determined through the following steps. The fluorescence intensity signal characteristic value of the solid-phase sensor was determined at 541 nm under 980 nm excitation light excitation. The fluorescence intensity value $F_0$ of the solid-phase sensor without sulphur dioxide derivatives and the fluorescence intensity value F of the solid-phase after adding sulphur dioxide standard solution were record. the fluorescence intensity characteristic signal value of the detection solution was calculated by $(F-F_0)/F_0$.

FIGS. 4A-4B showed a standard curve established for the sulphur dioxide derivatives with different concentrations. As shown in FIG. 4A, the fluorescence signal at 541 nm was enhanced with the increase of sulphur dioxide concentration in the sulphur dioxide standard solution. As shown in FIG. 4B, the standard curve $(F-F_0)/F_0=0.0211 \log(C_{ER})-0.1931$ for sulphur dioxide detection was plotted by linear fitting, where the correlation coefficient $R^2=0.9965$, the LOD was 2.24 nM, and the linear range was 10-100 mg/L.

(ii) Detection of Concentrations of Sulphur Dioxide Derivatives in the Rainwater.

The rainwater, collected at Jiangsu University, was divided into four samples (sample A, sample B, sample C and sample D, respectively). The four samples were each added with a 0 nM sodium sulfite standard solution, a 10 nM sodium sulfite standard solution, a 50 nM sodium sulfite standard solution and a 100 nM sodium sulfite standard solution. Subsequently, 100 µL of each of the four sample was taken for the detection. After incubation with the dye-functionalized flexible upconversion luminescence solid-phase sensor for 25 min, the fluorescence intensity signal characteristic value was measured and substituted into the standard curve obtained in step (S1).

Sulphur dioxide derivatives were not detected in the collected raw rainwater. Thus, the rainwater was respectively spiked with 10 nM, 50 nM and 100 nM of sulphur dioxide. The spiked samples were analyzed, and the corresponding spike recoveries were calculated to be 99.394%, 94.855% and 99.642%, respectively, demonstrating that the method provided herein was feasible for the detection of sulphur dioxide derivatives in rainwater.

It should be noted that the examples described above are merely intended to illustrate the present disclosure, rather than limiting the technical solutions of the present disclosure. Although the present disclosure has been illustrated and described in detail above, it should be understood that one of ordinary skill in the art can still make various modifications and equivalent replacements to the embodiments disclosed herein. It should be noted that those modifications and equivalent replacements made without departing from the spirit and scope of the present disclosure shall still fall within the scope of the present disclosure defined by the appended claims.

What is claimed is:

1. A method of preparing a dye-functionalized flexible upconversion-luminescence solid-phase sensor, comprising:
   (S1) mixing ytterbium chloride hexahydrate, yttrium chloride hexahydrate, and thulium chloride hexahydrate uniformly in a first solvent under ultrasonication; adding oleic acid and 1-octadecene followed by a first stirring and cooling to room temperature; dropwise adding sodium hydroxide, ammonium fluoride and a second solvent followed by sealing, heating, a second stirring, cooling to room temperature, and centrifugation to collect a precipitate; and rinsing the precipitate with a mixture of cyclohexane and ethanol followed by drying to give an upconversion-luminescence nanoparticle; wherein the first solvent and the second solvent are both methanol;
   (S2) mixing a polydimethylsiloxane monomer and a curing agent to obtain a mixture; adding the upconversion-luminescence nanoparticle to the mixture followed by stirring to form a gel; subjecting the gel to vacuum degassing, casting in a mold and vacuum degassing; pressing the mold with a cover plate followed by drying, curing, and cooling to room temperature to obtain an upconversion-luminescence nanoparticle-doped solid-phase sensor; and
   (S3) mixing sodium periodate, benzyl alcohol, acrylic acid and water to form a first solution; immersing the upconversion-luminescence nanoparticle-doped solid-phase sensor into the first solution followed by ultraviolet (UV) irradiation and a first rinsing to obtain a carboxyl-grafted upconversion-luminescence nanoparticle-doped solid-phase sensor; and
   mixing 1-(3-dimethylaminopropyl)-3-ethylcarbodiimide hydrochloride, hydroxysuccinimide, distilled water and a 2-(N-morpholino) ethanesulfonic acid buffer in a ratio of 10-30 (mg):5-15 (mg):0.5-1.5 (mL):0.3-0.6 (mL) to form a second solution; immersing the carboxyl-grafted upconversion-luminescence nanoparticle-doped solid-phase sensor into the second solution for incubation for 2 h followed by a second rinsing with distilled water to obtain a carboxyl-activated upconversion-luminescence nanoparticle-doped solid-phase sensor; immersing the carboxyl-activated upconversion-luminescence nanoparticle-doped solid-phase sensor into a pararosaniline solution for incubation for 11-13 h followed by a third rinsing with distilled water to obtain the dye-functionalized flexible upconversion-luminescence solid-phase sensor;
   wherein a concentration of the pararosaniline solution is 0.01-0.05 mg/mL.

2. The method of claim 1, wherein in step (S1), a ratio of the first solvent to the ytterbium chloride hexahydrate to the yttrium chloride hexahydrate to the thulium chloride hexahydrate is 5-15 (mL):0.03-0.1 (g):0.2-1 (g):0.001-0.01 (g); a volume ratio of the first solvent to the oleic acid to the 1-octadecene is 5-15:3-10:10-20; a ratio of the first solvent to the sodium hydroxide to the ammonium fluoride to the second solvent is 5-15 (mL):0.1-0.3 (g):0.1-0.3 (g):5-15 (mL); and a volume ratio of the cyclohexane to the ethanol is 1:1.

3. The method of claim 1, wherein in step (S1), the first stirring is performed magnetically at 150-170° C. under protection of nitrogen gas for 25-35 min; the heating is performed at 50-80° C. for 30-50 min; and the second stirring is performed at 290-310° C. for 50-70 min.

4. The method of claim 1, wherein in step (S2), a weight ratio of the polydimethylsiloxane monomer to the curing agent is 5-15:1-3; a weight ratio of the upconversion-luminescence nanoparticle to the mixture is 1:500; and the drying is performed at 90-110° C. for 50-70 min.

5. The method of claim 1, wherein in step (S3), a weight ratio of the sodium periodate to the benzyl alcohol to the acrylic acid to the water is 0.01-0.02:0.5-0.8:8-12:85-95; the UV irradiation is performed for 2-3 h; and the first rinsing is performed at 65-75° C.

6. The method of claim 1, wherein in step (S3), the second rinsing and the third rinsing are both performed at room temperature.

7. A method for detecting a gaseous pollutant, comprising:
   (a) preparing a dye-functionalized flexible upconversion-luminescence solid-phase sensor through the method of claim 1;
   (b) immersing the dye-functionalized flexible upconversion-luminescence solid-phase sensor respectively into standard solutions of the gaseous pollutant varying in concentration for reaction; drying the dye-functionalized flexible upconversion-luminescence solid-phase sensor with nitrogen gas; detecting fluorescence intensity signal characteristic values of the dye-functionalized flexible upconversion-luminescence solid-phase sensor respectively corresponding to the standard solutions; and performing linear fitting between concentrations of the standard solutions of the gaseous pollutant and the fluorescence intensity signal characteristic values, so as to establish a prediction model for concentration detection of the gaseous pollutant; and
   (c) subjecting a sample to preprocessing and extraction to obtain a solution containing the gaseous pollutant, wherein the sample is a food sample or an environment sample; immersing the dye-functionalized flexible upconversion-luminescence solid-phase sensor into the solution for reaction; drying the dye-functionalized flexible upconversion-luminescence solid-phase sensor with nitrogen gas; detecting a fluorescence intensity signal characteristic value corresponding to the sample; and substituting the fluorescence intensity signal characteristic value into the prediction model to calculate a concentration of the gaseous pollutant in the sample.

8. The method of claim 7, wherein in step (b), concentrations of the standard solutions of the gaseous pollutant derivative are 0-100 nM.

9. The method of claim 7, wherein in step (c), the gaseous pollutant derivative is selected from the group consisting of sulphur dioxide and derivatives thereof, carbon monoxide and derivatives thereof, ozone and derivatives thereof, and a combination thereof.

10. The method of claim 7, wherein in step (b), the reaction is performed for 9-11 min; and step (c), the reaction is performed for 9-11 min.

\* \* \* \* \*